United States Patent
Anderbrügge et al.

(10) Patent No.: US 7,507,921 B2
(45) Date of Patent: Mar. 24, 2009

(54) CONTROL DEVICE HAVING A ROTATING ACTUATOR

(75) Inventors: Nina Anderbrügge, Frankfurt (DE);
Norbert May, Eppertshausen (DE);
Simon Rauter, Offenbach (DE);
Michael Scheicht, Frankfurt (DE)

(73) Assignee: Siemens Aktiengesellschaft, München (DE)

( * ) Notice: Subject to any disclaimer, the term of this patent is extended or adjusted under 35 U.S.C. 154(b) by 531 days.

(21) Appl. No.: 10/886,985

(22) Filed: Jul. 8, 2004

(65) Prior Publication Data
US 2005/0034557 A1 Feb. 17, 2005

(30) Foreign Application Priority Data
Jul. 11, 2003 (DE) ................. 103 31 776

(51) Int. Cl.
*H01H 9/00* (2006.01)
(52) U.S. Cl. .............. 200/61.54; 200/61.27; 701/36; 345/157
(58) Field of Classification Search .......... 200/61.27, 200/61.54, 318; 701/1, 36; 345/157, 184, 345/160
See application file for complete search history.

(56) References Cited

U.S. PATENT DOCUMENTS

| | | | |
|---|---|---|---|
| 5,270,689 A | 12/1993 | Hermann | |
| 5,956,016 A | 9/1999 | Kuenzner et al. | |
| 6,005,299 A | 12/1999 | Hengst | |
| 6,246,129 B1 | 6/2001 | Schaefer | |
| 6,348,772 B1 | 2/2002 | May | |
| 6,411,934 B1 | 6/2002 | Möller et al. | |
| 6,961,644 B2 | 11/2005 | Mercier et al. | |
| 2002/0118010 A1* | 8/2002 | Pointer | 324/207.2 |
| 2004/0117084 A1 | 6/2004 | Mercier et al. | |
| 2004/0233161 A1* | 11/2004 | Shahoian et al. | 345/156 |

FOREIGN PATENT DOCUMENTS

| | | |
|---|---|---|
| DE | 37 40 022 | 5/1989 |
| DE | 197 32 287 A1 | 7/1997 |
| DE | 199 41 960 | 3/2001 |
| DE | 100 16 189 C2 | 10/2001 |
| DE | 103 15 721 | 11/2004 |
| EP | 0 366 132 | 5/1990 |
| EP | 0 796 756 | 9/1997 |
| EP | 0 831 504 | 3/1998 |
| EP | 1 138 544 | 10/2001 |
| EP | 1 251 536 | 10/2002 |
| WO | WO 2004/053661 | 6/2004 |

OTHER PUBLICATIONS

German Office Action dated Feb. 2, 2004.
French Search Report dated May 10, 2007 issued in a corresponding foreign application.

* cited by examiner

*Primary Examiner*—Kyung Lee
(74) *Attorney, Agent, or Firm*—Cohen Pontani Lieberman & Pavane LLP

(57) ABSTRACT

A control device has a rotating actuator which is mounted rotatably about an axis of rotation so that control parameters can be input by rotation. The rotating actuator is mounted displaceably along a movement curve so that control parameters can be input into the device by means of a longitudinal displacement of the rotating actuator. The additional degree of operating freedom increases the information density of the exchange between user and machine in an ergonomically particularly advantageous manner.

36 Claims, 2 Drawing Sheets

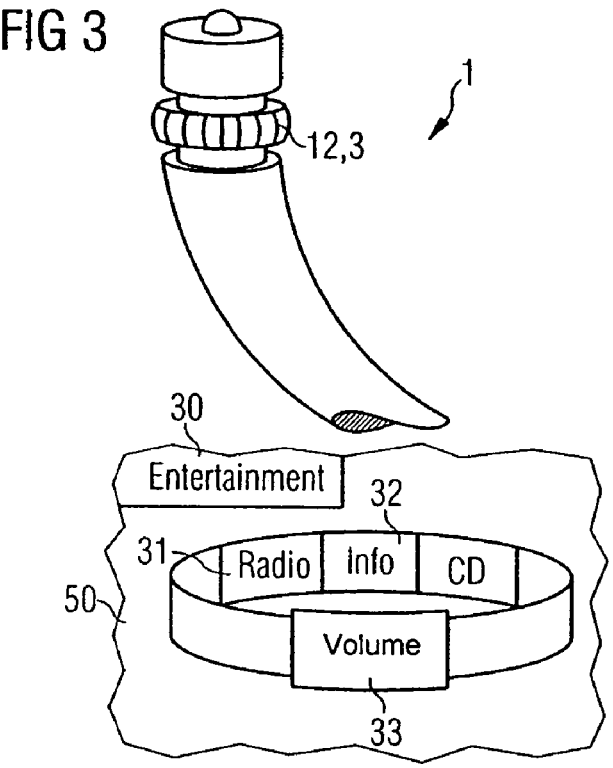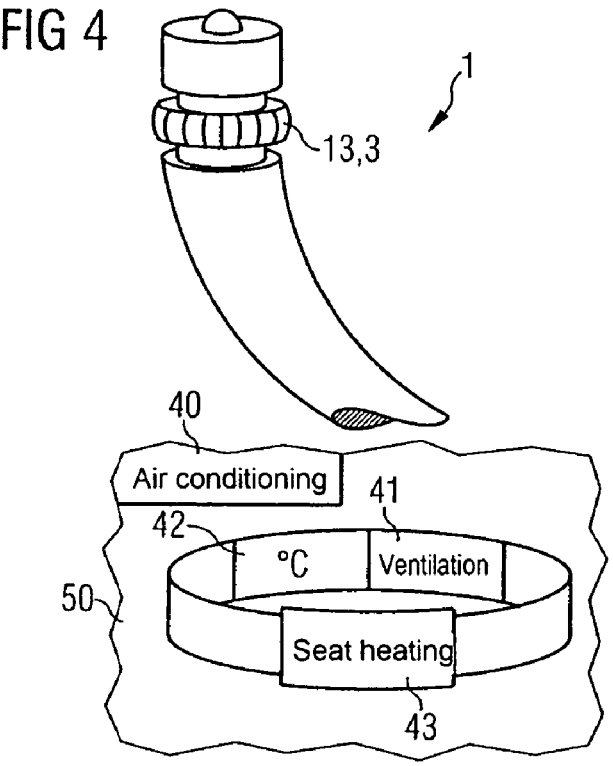

CONTROL DEVICE HAVING A ROTATING ACTUATOR

BACKGROUND OF THE INVENTION

1. Field of the Invention

The invention relates to a control device, in particular in a motor vehicle, having a rotating actuator which is mounted rotatably about an axis of rotation, it being possible for control parameters to be input into the device by means of rotation of the rotating actuator.

2. Description of the Related Art

With the increasing complexity of devices, in particular within the context of functions of mechanical subassemblies being taken on by electric or electronic subassemblies, in particular in combination with servomotor drives, control devices of the generic type have become greatly diverse. The great advance in innovations in conjunction with function displays in the control of devices has revolutionized the ergonomics of control devices. Advantageous operating concepts take into consideration the particular characteristics of human anatomy and the particular application. The increasing complexity of devices necessitates an increase in the bidirectional flow of information between the person and the machine and so further sense organs in addition to the eye are included.

U.S. Pat. No. 6,348,772 discloses a control device of the generic type, in which, in addition to an optical display, a haptic feedback indicates in sensory fashion to the user the function which has been selected. A great disadvantage of this control device resides in the extremely limited input possibilities. The device has too few ergonomically advantageous mechanical degrees of freedom. The implementation of a high number of degrees of freedom in a control device of the generic type places the ergonomics before problems which have not been solved to date, since a high number of degrees of operating freedom can become too complicated for convenient operation, in particular in a motor vehicle, and too low a number of degrees of operating freedom can force the user, in the case of a complicated device having a large number of functions, to move through endless menus in an unacceptably time-consuming manner in order to select the desired function.

SUMMARY OF THE INVENTION

The object of the invention to provide a control device which has a high number of degrees of operating freedom and at the same time does not overload the user in its operation, in particular does not require an increased learning effort by the user.

According to the invention, the rotating actuator is mounted displaceably along a movement curve and control parameters can be input into the device by means of displacement of the rotating actuator along the movement curve.

One particular advantage of the control device according to the invention resides in the fact that the user can use the rotating actuator, by means of rotation, in order to set a first control parameter and, by means of displacement, in order to set a second control parameter. A further advantage of this ergonomics is that the user does not tend to confuse the two degrees of adjusting freedom of the operating device. In addition, it is also not possible for the shaking typical of the operation of a motor vehicle to result in an inadvertent adjustment of the operating device according to the invention, not even during the operating process, since an adjustment of the rotating actuator requires torques which conventionally do not belong in sufficient strengths to the shaking phenomena in the motor vehicle.

According to a preferred embodiment, the movement curve is arranged in a movement plane and has a constant radius. This design simplifies, on the one hand, the mounting of the rotating actuator, and, on the other hand, the rotating actuator, given an appropriate orientation, can be arranged in a manner more secure against shaking in respect of an adjustment in the direction of the movement curve.

The movement curve is advantageously a tangent of the axis of rotation in each position of the rotating actuator. This avoids a particular mechanical outlay on the mounting of the rotating actuator. For example, a combination of the rotary bearing of the rotating actuator with the bearing for the longitudinal displaceability along the movement curve to form a single sliding bearing is expedient here. The device turns out to be particularly simple if the movement curve is a straight line, in particular if this straight line runs essentially parallel to the axis of rotation.

The guidance in the longitudinal direction of the movement curve and in the rotational direction of the rotating actuator turns out to be particularly expedient if the rotating actuator is a cylindrical hollow body which is mounted rotatably and displaceably on a support. In this case, the inner circumferential surface of the cylindrical hollow body is expediently designed at least in part as a sliding bearing, this sliding-bearing surface corresponding with a second sliding-bearing surface of cylindrical design on the support. In an expedient development of the invention, the rotating actuator is designed as a cylindrical ring and is mounted rotatably and displaceably on the support. One substantial advantage of this design of the invention resides in the fact that the rotating actuator can be arranged on the support in such a manner that it is accessible along the entire circumference. The user can advantageously grasp the rotating actuator over its entire outer circumference and therefore applies the operating force for the rotating actuator more easily in the sense of improved ergonomics. This expediently enables a damping, friction or inhibiting force opposed to the operating direction to be selected to be correspondingly greater, and an accidental slipping out of the current actuating position of the operating device when subjected to shaking is correspondingly more unlikely. In addition, the user is much better able to feel fine details of the operation, for example to perceive haptic feedbacks or the latching of the rotating actuator in a certain angular position or longitudinal position.

Of particular advantage in a motor vehicle is the design of the support of the operating device as a steering wheel. This means that the user, when actuating the control device, does not need to remove one hand from the directional controlling means of the motor vehicle. In this case, the support may be a solid steering wheel but may particularly advantageously be an open steering wheel. In an open steering wheel, as is frequently provided in the case of "steer by wire" concepts, the control device according to the invention is expediently provided on a thumb-side grip end of the steering wheel. In a similar manner, the arrangement of the operating device on a gear shift lever is advantageous, the gear shift lever here being the support of the operating device. In particular in the case of conventional vehicles, it is expedient if the support is a steering column assembly and the rotating actuator is arranged in the manner of a steering column switch. In all of the arrangements, the arrangement of the operating device according to the invention on a thumb-side grip end of a grip, as, for example, on the grip of a joystick, is ergonomically expedient. In particular in a motor vehicle and within the context of retrofitting, the support is advantageously designed as a flexible, elongate element, in particular in the form of a swan neck. In this case, again the advantageous configuration as a grip may also be used if the operating element is arranged in the vicinity of a user-side end of the elongate element, which end is designed primarily as a grip.

In order for it to be possible for the user to differentiate between different switch positions of the control device solely by the sense of touch of the operating hand, it is expedient if the rotating actuator has a noticeable latching in different angular positions during the rotation. In the same manner, a noticeable latching of the rotating actuator in different longitudinal positions during displacement is expedient. One expedient development makes provision for the rotating actuator to have a neutral position on the movement curve, and for the user to be able to move the rotating actuator from the neutral position along the movement curve merely counter to a restoring force. This enables the user, when repeatedly exerting force in one direction along the movement curve, to transfer a corresponding switching pulse in each case to the device control.

In the case of a control device providing a plurality of positions of the rotating actuator in the longitudinal direction of the movement curve, it is expedient if the rotating actuator can be moved between just three different longitudinal positions, so that the user is not overstressed when operating the control device.

The complex functions of the devices to be operated make it necessary as a rule for the rotational adjustment and the longitudinal adjustment to be assigned a hierarchical operating structure. In this connection, it is expedient if the rotational adjustment is subordinate to the longitudinal adjustment in the hierarchy of the operating structure. For example, it is conceivable to find, in one longitudinal position in each case, the menu items communication, entertainment or air-conditioning in the operating structure, and below this overriding hierarchy level, for example for air-conditioning, to be able to select between the lower items of ventilation, temperature or seat heating by means of rotation of the rotating actuator. In particular if the number of upper menu items is higher than the number of lower menu items, it is also conceivable for the rotational adjustment to be subordinate to the longitudinal adjustment in the hierarchy of the operating structure. Ergonomically, it is more expedient in every case to assign the plurality of switching options to the rotational adjustment of the rotating actuator.

In particular, so that a confirmation function can be implemented in the hierarchical operating structure, it is expedient if the operating device has a second operating element which is expediently designed with a binary switching function. It is particularly expedient if the second operating element is designed as a push button with an actuating direction running parallel to the axis of rotation of the rotating actuator. This greatly reduces the risk of misoperation of the second operating element. In particular when the control device is designed as a handle in the manner of a joystick, it may be expedient to design the second operating element as a push button with an actuating direction running radially with respect to the axis of rotation of the rotating actuator. In this case, the arrangement of two second operating elements is also conceivable, in which case the one has a radial actuating direction and the other an axial actuating direction in each case with respect to the axis of rotation of the rotating actuator. A further advantage according to the invention is that the rotating actuator can be designed in such a manner that an infinitely variable setting of a control parameter is possible by means of the rotational movement.

In order to increase the operational reliability, the rotating actuator is advantageously provided with radial elevations which extend in the longitudinal direction along the axis of rotation for the purpose of better perception of the current angular position of the rotating actuator. If a better differentiability of the longitudinal position of the rotating actuator is desired, a corresponding profiling having elevations running in the circumferential direction on the outer circumference of the rotating actuator may afford advantages.

Since additional optical and acoustic signals can be frequently difficult to perceive during operation of devices in the motor vehicle in traffic, it is expedient if the rotating actuator has haptic feedback functions as a function of the use situation. Thus, it may be advantageous if a counterforce can be transmitted to the user counter to the operating direction by means of the rotating actuator as a function of the use situation. In the same manner, it is expedient to transmit oscillations or tactile vibrations to the user.

A particularly wear-free and reliable design of the control device makes provision for the position of the rotating actuator to be detected by means of optical sensors. Equipping the control device with permanent magnets and sensors, by means of which the position of the rotating actuator can be detected, is cost-effective and similarly advantageous. In this case, it is particularly expedient if the rotating actuator is designed as a cylindrical hollow body, in particular as a ring, and has at least one permanent magnet for detecting the position and/or for actuation haptics and/or latching purposes.

An optimum user ergonomics makes provision for the position and/or change in setting of the control device to be fed back optically and/or acoustically and/or haptically to the user. In this case, the optical feedback can take place by means of a normal display, in particular in an instrument cluster, or by means of head-up displays in the windshield.

The invention is described in greater detail below using one specific exemplary embodiment with reference to drawings merely for the purpose of clarification without restricting the subject matter of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 2 to 4 are perspective, schematic views of an operating device according to the invention having function selection, illustrated in each case symbolically, by means of the rotating actuator.

DETAILED DESCRIPTION OF THE PRESENTLY PREFERRED EMBODIMENTS

Figure 1:
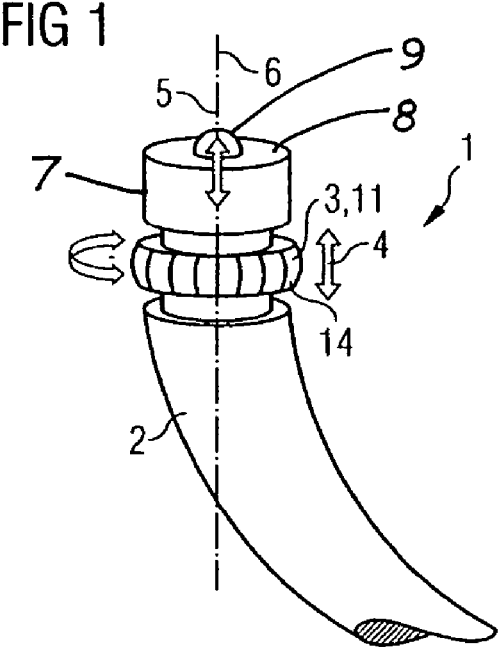
FIG. 1 is a perspective, schematic view of a control device according to the invention.

The control device 1 illustrated in FIG. 1 essentially has a support 2 on which a rotating actuator 3 according to the invention is slidingly mounted in a manner such that it can be displaced longitudinally in a longitudinal direction 4 and such that it can be rotated about an axis of rotation 5. The rotating actuator 3 can be moved along a straight movement curve 6 which extends in the longitudinal direction 4 of the support 2. The support 2 has a user-side end 7 on whose end surface 8 a second operating element 9 is formed as a push button. The rotating actuator 3 can be moved to and fro along the movement curve 6 between three different longitudinal positions, namely between a first position 11, a second position 12 and a third position 13. The rotating actuator 3 is designed as a cylindrical ring and extends around the entire circumference of the support 2, which is likewise of cylindrical design. In this case, the rotating actuator 3 is accessible over the entire circumference and its outer surface, which is provided with elevations 14, can be touched or grasped by the user in its entirety.

Figure 2:
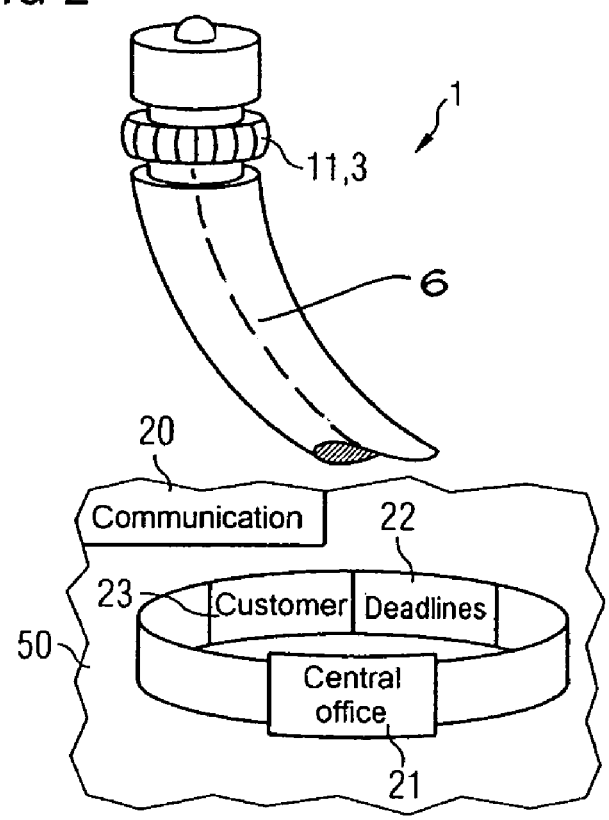

FIGS. 2 to 4 illustrate the control device according to the invention with the rotating actuator 3 in the first position 11, second position 12 and third position 13, respectively. A display segment 50 which displays the current position in a menu structure is likewise illustrated in FIGS. 2 to 4. In the first position 11, the upper menu item communication 20 is selected and, by means of a rotational movement of the rotating actuator 3 about the axis of rotation 5, a selection can be made between the central office 21, deadlines 22, customers 23. In the second position 12, the user is in the upper menu item of entertainment 30 in the operating structure where he can select between the lower menu items of radio 31, info 32 and volume 33 by means of angular adjustment of the rotating actuator 3. In the third position of the rotating actuator 3, below the upper menu item of air-conditioning 40, the user can make a selection between the lower menu items of ventilation 41, temperature 42 and seat heating 43 by means of angular adjustment of the rotating actuator 3. Here the support 2 is an open steering wheel and the movement curve 6 is on a constant radius Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control device for a motor vehicle, the control device comprising:
   a support; and
   a rotatable actuator comprising a hollow cylindrical body which is mounted rotatably and displaceably on said support and having an axis of rotation, said actuator being longitudinally displaceable along a non-linear movement curve in order to select a control parameter, said actuator being rotatable about said axis of rotation to select a control parameter.

2. A control device as in claim 1 wherein the movement curve is arranged in a movement plane and has a constant radius.

3. A control device as in claim 1 wherein the axis of rotation is tangent to the movement curve in each position of the actuator along the movement curve.

4. A control device as in claim 1 wherein said hollow cylindrical body is a ring having a circumference, said ring being accessible along the entire circumference.

5. A control device as in claim 1 wherein the support is a steering wheel.

6. A control device as in claim 5 wherein the support is a solid steering wheel.

7. A control device as in claim 5 wherein the support is an open steering wheel.

8. A control device as in claim 5 wherein the steering wheel controls a motor vehicle by means of control signals without direct mechanical coupling to the wheels to be steered.

9. A control device as in claim 1 wherein the support is a gear shift lever.

10. A control device as in claim 1 wherein the support is a steering column, and the rotating actuator is arranged as a steering column switch.

11. A control device as in claim 1 wherein said rotating actuator is latchable in discrete angular positions.

12. A control device as in claim 1 wherein said actuator is one of displaced longitudinally and rotated in order to select a set of control parameters, and is the other of displaced longitudinally and rotated in order to select a control parameter in said set.

13. A control device as in claim 12 wherein said actuator is displaced longitudinally in order to select a set of control parameters, and is rotated in order to select a control parameter in said set.

14. A control device as in claim 12 wherein said actuator is rotated in order to select a set of control parameters, and is displaced longitudinally in order to select a control parameter in said set.

15. A control device as in claim 1 wherein said support is a flexible elongate element.

16. A control device as in claim 1 wherein said support is an elongate element having an end, said hollow cylindrical body being arranged at a position on said elongate element a distance from said end.

17. A control device as in claim 1 further comprising an operating element having a binary switching function.

18. A control device as in claim 17 wherein said operating element has a confirmation function in a hierarchical operating structure.

19. A control device as in claim 18 wherein said operating element is a push button having an actuating direction parallel to the axis of rotation of the actuator.

20. A control device as in claim 17 wherein said operating element is a push button having an actuating direction running radially to the axis of rotation of the actuator.

21. A control device as in claim 1 wherein rotation of said actuator permits an infinitely variable selection of a control parameter.

22. A control device as in claim 1 wherein said rotating actuator has radial elevations.

23. A control device as in claim 1 wherein said rotating actuator has haptic feedback functions as a function of the control parameter selected.

24. A control device as in claim 23 wherein the haptic feedback functions comprise a counterforce transmitted to the user counter to the direction of rotation of the actuator.

25. A control device as in claim 23 wherein the haptic feedback functions comprise a vibration which is transmitted to a user.

26. A control device as in claim 1 further comprising optical sensors for detecting the position of the rotating actuator.

27. A control device as in claim 1 further comprising permanent magnets and magnetic sensors for detecting the position of the rotating actuator.

28. A control device as in claim 1 further comprising feedback means for indicating the position of the actuator, wherein said feedback means is at least one of optic, acoustic, and haptic feedback means.

29. A control device as in claim 28 wherein said feedback means comprises optic feedback means comprising a display.

30. A control device for a motor vehicle, the control device comprising a rotatable actuator having an axis of rotation, said actuator being longitudinally displaceable along a movement curve in order to select a control parameter, said actuator being rotatable about said axis of rotation to select a control parameter, wherein said rotating actuator is latchable in discrete longitudinal positions along said movement curve, and wherein the axis of rotation is tangent to the movement curve in each position of the actuator along the movement curve.

31. A control device as in claim 30 wherein the movement curve is a straight line.

32. A control device as in claim 31 wherein the movement curve parallels the axis of rotation.

33. A control device as in claim 30 wherein the rotating actuator is latchable in three discrete longitudinal positions.

34. A control device as in claim 30 further comprising a support, said support having a curved, non-linear longitudinal axis, the movement curve corresponding to the longitudinal axis.

35. A control device as in claim 30 wherein the movement curve is non-linear.

36. A control device for a motor vehicle, the control device comprising a rotatable actuator having an axis of rotation, said actuator being longitudinally displaceable along a movement curve in order to select a control parameter, said actuator being rotatable about said axis of rotation to select a control parameter, wherein said rotating actuator comprises a cylindrical hollow body, the control device further comprising at least one permanent magnet for at least one of detecting the position of the actuator and actuation haptics and latching.

\* \* \* \* \*